O. D. H. BENTLEY.
LUBRICATING DEVICE.
APPLICATION FILED AUG. 29, 1917.

1,304,730.

Patented May 27, 1919.

UNITED STATES PATENT OFFICE.

OLIVER D. H. BENTLEY, OF ROSLINDALE, MASSACHUSETTS, ASSIGNOR TO B. F. STURTEVANT COMPANY, OF HYDE PARK, MASSACHUSETTS, A CORPORATION OF MASSACHUSETTS.

LUBRICATING DEVICE.

1,304,730.      Specification of Letters Patent.      Patented May 27, 1919.

Application filed August 29, 1917. Serial No. 188,849.

*To all whom it may concern:*

Be it known that I, OLIVER D. H. BENTLEY, a citizen of the United States, residing at Roslindale, in the county of Suffolk and State of Massachusetts, have invented certain new and useful Improvements in Lubricating Devices; and I do hereby declare the following to be a full, clear, and exact description of the invention, such as will enable others skilled in the art to which it appertains to make and use the same.

The present invention relates to lubricating devices for bearings, and more particularly to that class of devices in which a carrying member such as an oil ring is employed for supplying lubricant to the bearing from a reservoir located beneath the same.

One of the objects of the present invention is to improve the efficiency of the above type of lubricating devices by increasing the amount of lubricant supplied to the bearing by the carrying member or ring. Another object is to provide for a more efficient distribution of the lubricant throughout the bearing. With these and other objects in view, as will hereinafter appear, the present invention consists in the devices and combinations of devices hereinafter described and claimed.

Figure 1:
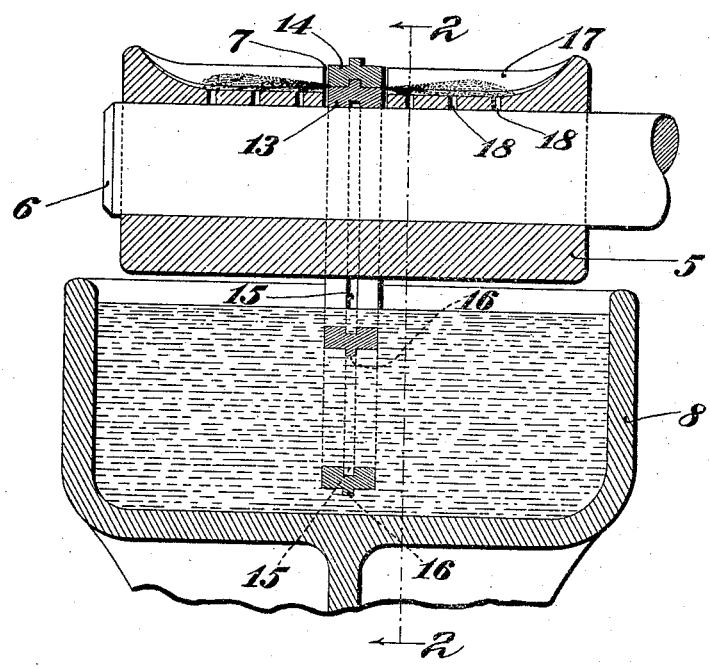
Figure 2:
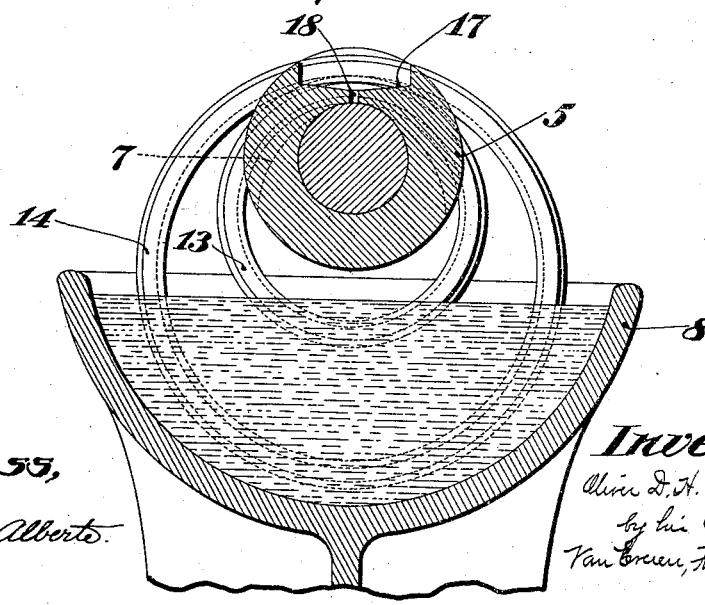

In the accompanying drawings, Figure 1 is a vertical longitudinal section through the bearing; and Fig. 2 is a vertical transverse section on line 2—2, Fig. 1, looking in the direction of the arrows, certain portions being omitted for clearness of illustration.

As shown in the drawings, the bearing sleeve 5 for the rotating shaft 6 is cut away as shown at 7 to provide passage for the oil-carrying rings or members which operate to transfer oil from the oil reservoir 8 to the rotating shaft and bearing.

The oil rings are of two sizes, a smaller ring 13 which rests upon the shaft at the top, supporting in turn a larger ring 14, and both rings at their lower portions dipping beneath the surface of the oil in the reservoir. Preferably the rings are formed with a groove 15 on their inner faces, and with a corresponding rib 16 on their outer faces, the rib 16 of the smaller ring 13 entering the groove 15 of the larger ring 14, thus maintaining the rings in alinement.

It will be observed that by the employment of a pair of rings arranged as above described a greatly increased supply of lubricant is furnished to the bearing. Not only is the lubricant which is carried up by the inner surface of the inner ring 13 transferred directly to the rotating shaft 6 as with the ordinary form of oil ring bearing, but the lubricant on the outer face of the inner ring 13 and the inner face of the outer ring 14 is also supplied to the bearing, being squeezed out or thrown out laterally of the rings, that is, axially of the shaft and bearing as the rings come together at the top of the bearing. The groove 15 in the outer ring 14 is particularly efficacious in raising the lubricant from the reservoir, and the rib 16 on the inner ring 13, as it enters the groove in the outer ring, forces the lubricant out of the groove and on to the flat faces of the rings from which it is forcibly thrown out axially of the shaft and bearing to be distributed along the same.

By providing a groove or channel 17 along the top of the bearing block or sleeve 5 with oil holes or passages 18 leading from the bottom of the groove to the inner surface of the bearing, the latter will be kept well lubricated, even at considerable distances from the oil ring.

While in the drawings are shown a pair of coöperating oil rings, it is evident that additional rings may be used if an increased amount of lubricant is desired. By providing a plurality of rings of different sizes having a groove on their inner face, and a corresponding rib on their outer face, the appropriate sizes and numbers of rings may be selected for any given bearing.

Having thus described the present invention, what is claimed is:

1. The combination with the shaft of a bearing having an oil ring receiving groove and an oil passage extending from the top of the bearing adjacent the groove to the bearing surface, an oil reservoir, an oil ring dipping into the oil in the reservoir, and means for delivering the oil from the outer surface of the ring axially of the shaft into the oil passage.

2. The combination with the shaft and bearing sleeve having an oil receiving channel in its upper surface, of an oil reservoir, an oil ring with its inner surface contacting with the top of the shaft, the ring dipping into the oil in the reservoir, and means in rolling contact with the outer surface of the ring at the top thereof for delivering the oil from said surface axially of the bearing into the oil receiving channel.

3. The combination with the shaft of a bearing having an oil ring receiving groove and an oil passage extending from the top of the bearing adjacent the groove to the bearing surface, an oil reservoir, oil rings of different diameters eccentrically arranged one within the other, said rings dipping into the oil in the reservoir and having substantially cylindrical contacting surfaces adjacent the ends of the rings to force the oil laterally from between the rings.

4. The combination with the shaft and bearing sleeve, of an oil reservoir, and a pair of oil-carrying members driven from the shaft and contacting with the oil in the reservoir, said members coöperating to deliver oil axially of the shaft to the outside of the bearing sleeve at the top.

5. The combination with the shaft and bearing, of a reservoir, and a pair of oil rings of different diameters eccentrically arranged one within the other, in contact at their top and separated at their bottom, and one of said rings having a groove in its contacting face.

6. The combination with the shaft and bearing, of an oil reservoir, and a pair of oil rings of different diameters eccentrically arranged one within the other, in contact at their top and separated at their bottom, said rings being provided with a coöperating rib and groove on their contacting faces.

7. The combination with the shaft and bearing, of an oil reservoir, and an oil ring with its inner surface contacting with the top of the shaft, the ring dipping both its inner and outer surfaces into the oil in the reservoir and arranged to deliver oil from its inner surface to the portions of the bearing nearer the ring and means coöperating with the ring for delivering oil from its outer surface to the portions of the bearing farther from the ring.

OLIVER D. H. BENTLEY.

Copies of this patent may be obtained for five cents each, by addressing the "Commissioner of Patents, Washington, D. C."